Sept. 1, 1964             L. F. SCHMID             3,146,859

AXIALLY AND TRANSVERSELY MOVABLE DISK BRAKE FOR VEHICLES

Filed July 27, 1961             2 Sheets-Sheet 1

INVENTOR
Leopold F. SCHMID
BY Dicke, Craig & Freudenberg
ATTORNEYS

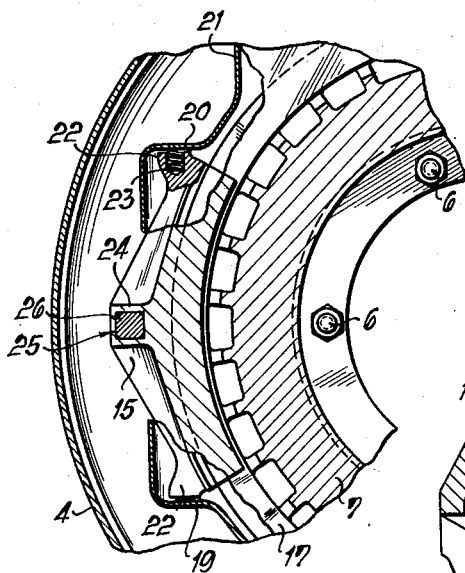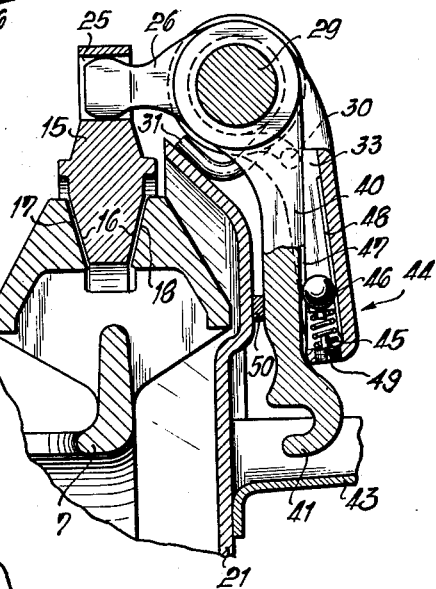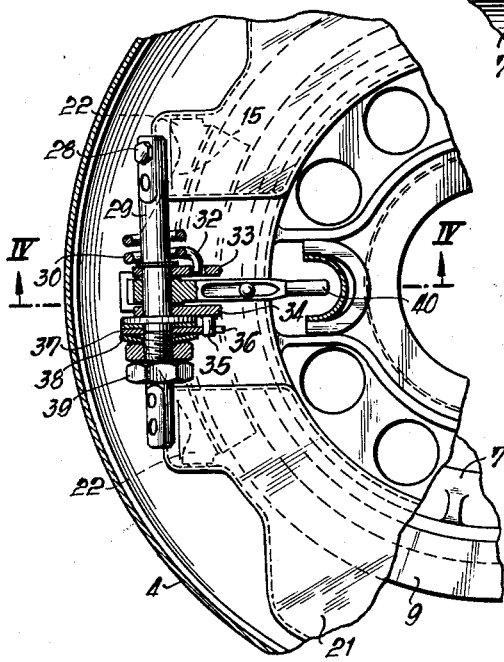

United States Patent Office

3,146,859
Patented Sept. 1, 1964

3,146,859
AXIALLY AND TRANSVERSELY MOVABLE
DISK BRAKE FOR VEHICLES
Leopold F. Schmid, Stuttgart, Germany, assignor to Firma
Dr. Ing. h.c.F. Porsche K.G., Stuttgart-Zuffenhausen,
Germany
Filed July 27, 1961, Ser. No. 127,390
Claims priority, application Germany Aug. 4, 1960
9 Claims. (Cl. 188—70)

The present invention relates to a disk brake for vehicles, especially for motor vehicles provided with a manually actuatable brake or hand brake which engages the common brake disk independently of the foot brake installation.

With the constructions of this type known in the prior art, by reason of the relatively small amount of space available within the wheel rim in which the mutually independent brake systems have to be accommodated, the hand brake generally was combined with a hydraulically actuated foot brake installation in such a manner that a lever mechanism, when pulling up the hand brake, presses the common friction linings with the aid of the hydraulic actuating pistons against the brake disk. The clamping effect of the actuating pistons forced mechanically against the brake disk, however, is not capable to safely hold the vehicle, especially on an incline, which is primaril due to the fact that disk brakes do not provide any servo effect. In order to eliminate these shortcomings, it has been proposed already, inter alia, to arrange a band brake along the outer circumference of the brake disk. Such a construction, however, entails the disadvantage that it is difficult to pivotally connect the actuating mechanism for the actuation of the brake and that essentially only the brake clamp of the foot brake is available for the securing or mounting purpose. A complicated and multipartite construction involving a large number of parts results therefrom. Additionally, the guidance of the brake band along the relatively narrow friction suface at the circumference of the brake disc causes difficulties, and the braking effect is only relatively slight by reason of the relatively small brake base.

According to the present invention, these disadvantages are voided by a manual or hand brake which comprises a wedge-shaped brake segment which cooperates with friction surfaces arranged along the periphery of the brake disk and inclined at an angle to each other. It is possible thereby to accommodate an effective hand brake with sufficiently large total brake surface in the relatively small space available within the wheel rim or wheel felly. The guide difficulties are simultaneously eliminated by the use of a wedge-shaped brake segment since the segment is self-centering, and also the pivotal connection of the individual actuating members may be realized with simple means. A spatially favorable arrangement of the brake segment is achieved by arranging the friction surfaces corresponding to the brake segment especially between the friction surfaces of the friction members of the foot brake installation. The brake segment is retained advantageously against the effect of elastic or resilient means with limited radial play between abutments along the circumference of the brake disk and is actuated by a swingable pressure member having an axis of rotation disposed laterally of the brake segment. There is achieved by such an arrangement a safe guidance of the brake segment and simultaneously the advantage that the brake segment cannot rattle in the neutral position thereof, i.e., with a disengaged hand brake. The pressure member engages through an intermediate lever the actuating linkage of the brake installation by the interposition of an adjusting mechanism, preferably an automatic readjusting mechanism whereby there is achieved an installation which is service-free or readily accessible for readjusting operations.

Of course, instead of an automatic readjusting mechanism, an adjustment possibility may be provided which is re-adjusted manually. The readjusting mechanism consists, in a simple manner, of a spring-loaded adjusting disk and of a ball also spring-loaded which slides within grooves of the pressure member and intermediate lever. The pressure member is constituted by a double-armed lever of essentially U-shaped cross section against one leg portion of which engages a return spring whereas the other leg portion of the U is in operative engagement with the adjusting disk loaded by a spring whereby the force of the last-mentioned spring overcomes that of the return spring. Consequently, relatively few and simple parts are sufficient for the automatic readjustments whereby a connection of the individual brake members among each other is assured which is safe in operation.

Accordingly, it is an object of the present invention to provide a manually actuatable hand brake for a disk brake installation which is independent of the hydraulically actuated foot brake and which effectively eliminates the aforementioned disadvantages and shortcomings encountered with the prior art constructions.

It is another object of the present invention to provide a hand brake for use with a disk brake installation of the type described hereinabove which is simple in construction, reliable in operation and which can be readily accommodated within the relatively small space available within the wheel rim.

A further object of the present invention resides in the provision of a manual brake for use with a hydraulically actuated disk brake assembly which permits a secure holding of the vehicle even while standing on an incline without the use of a brake providing a servo-effect.

Still another object of the present invention resides in the provision of a manually actuatable parking brake for a vehicle, especially for a motor vehicle having a hydraulically actuated disk brake installation, which manually actuated parking brake may be readily connected to the respective parts available with the disk brake installation and without involving a complicated construction and/or an excessively large number of individual parts to accomplish the desired results mentioned hereinabove.

A further object of the present invention resides in the provision of a manually actuatable brake adapted to cooperate with the disk of a disk brake which provides a relatively large total brake surface and therewith a good braking effect and which may be readily accommodated within the relatively small space available within the wheel rim.

Still another object of the present invention resides in the provision of a manually actuatable brake for use with a disk brake installation which is effectively self-centering by the use of an appropriately shaped brake segment and in which the difficulties are effectively eliminated as regards guidance and pivotal connection of the various parts including the actuating parts for the manually actuatable brake.

Another object of the present invention resides in the provision of a hand brake adapted to cooperate with the brake disk of a disk brake installation which is adapted to be actuated independently of the foot brake installation of the vehicle, which produces a safe and effective braking action and which prevents rattling of the brake in the disengaged position thereof.

Still a further object of the present invention resides in the provision of a manually actuatable hand brake of the type mentioned hereinabove which is provided with a simple readjusting mechanism that is readily accessible for servicing and operative normally to produce an automatic readjustment.

These and other objects, features and advantages of the present invention will become more obvious from the following description when taken in connection with the accompanying drawing which shows, for purposes of illustration only, one embodiment in accordance with the present invention, and wherein FIGURE 1 is an axial cross sectional view through a disk brake arranged within the wheel rim of a motor vehicle and provided with a hand brake according to the present invention.

FIGURE 2 is a partial cross sectional view taken along line II—II of FIGURE 1;

FIGURE 3 is a partial cross sectional view taken along line III—III of FIGURE 1, and FIGURE 4 is a partial longitudinal cross sectional view, on an enlarged scale, of the actuating linkage for the brake segment, taken along line IV—IV of FIGURE 2.

Figure 1:
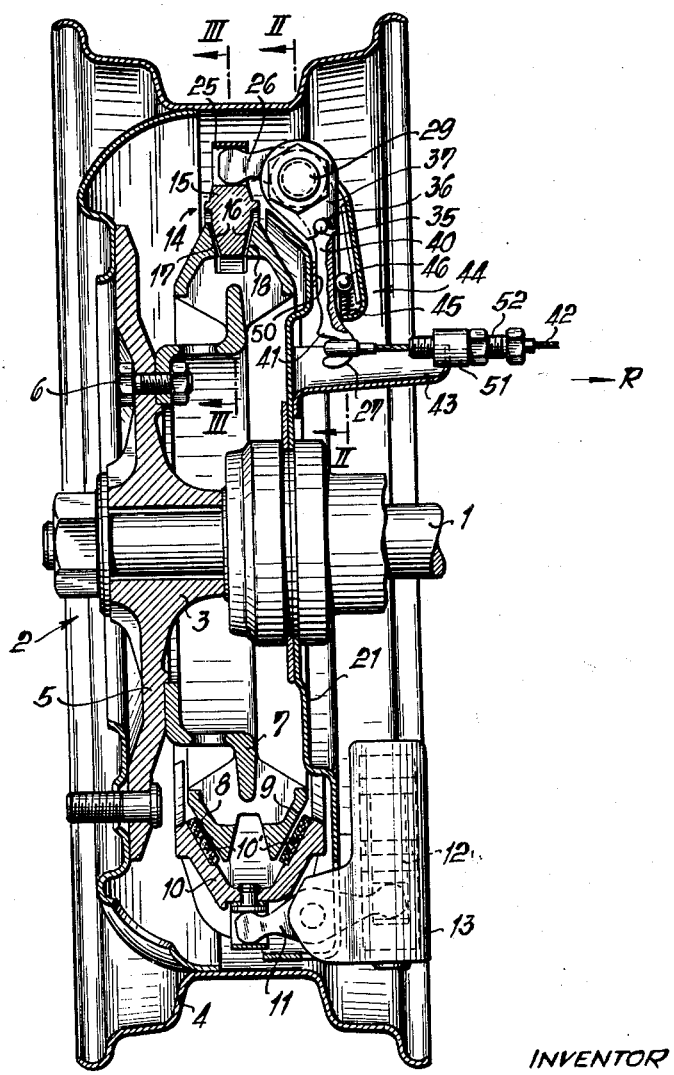

Referring now to the drawing wherein like reference numerals are used throughout the various views to designate like parts, reference numeral 1 designates therein the drive shaft of a motor vehicle wheel 2. A wheel hub 3 is secured to the drive shaft 1 in any suitable manner which wheel hub carries the wheel rim 4 as is conventional. A brake disk 7 is secured within the wheel rim 4 at a flange part 5 of the hub 3 by means of bolts 6 distributed along the circumference. The brake disk 7 is provided with friction surfaces 8 and 9 mutually inclined at an angle with which are associated or to which are coordinated V-shaped brake shoes 10 of which only one brake shoe is illustrated in the drawing. The brake shoes 10 are actuated through a swinging member or lever 11 by hydraulically actuated pistons 12 of the foot brake installation 13.

A manually actuatable brake generally designated by reference numeral 14 is arranged at the circumference of the brake disk 7 between the brake shoes 10 which hand or parking brake 14 includes a brake segment 15 having wedge-shaped friction surfaces 16. The friction surfaces 16 of the brake segment 15 cooperate with the friction surfaces 17 and 18 provided along the circumference of the brake disk 7 which are also constructed in a wedge-shaped manner. The friction surfaces 17 and 18 are arranged between the friction surfaces 8 and 9 coordinated to the brake shoes 10 and are oppositely inclined with respect thereto. The brake segment 15 is arranged between angularly-bent web portions 19 and 20 (FIGURE 3) of a sheet metal cover 21 with circumferential play whereby, depending on the direction of rotation of the brake disk 7, the to and fro movement is damped by pressure springs 23 inserted in extensions 22 of the brake segment 15. The sheet metal cover member 21 covers the brake disk 7 in a protective manner.

The brake segment 15 is provided in the center thereof intermediate its ends with a projection 24 having an aperture 25 into which engages a double-armed lever 26 of the brake linkage 27. The double-armed lever 26 is pivotally supported about a bolt 29 secured at the sheet metal cover 21 by means of screws 28. The double-armed lever which is of essentially U-shaped cross section is under the influence of a return spring 30 one end 31 of which rests against the sheet metal cover 21 (FIGURE 4) whereas the other end 32 of the spring 30 is operatively connected with the leg portion 33 of the lever 26 (FIGURE 2). The second leg portion 34 of the double-armed lever 26 is provided with a projection 35 which is in engagement with a recess or cut-out portion 36 of an adjusting disk 37 pivotally retained about the bolt 29. Between the projection 35 and the recess 36 of the adjusting disk 37 is left some play which corresponds essentially to the desired venting play between the friction surfaces 16 of the brake segment 15 and the friction surfaces 17 and 18 of the brake disk 7. The adjusting disk 37 is under the effect of a dish-shaped spring 38 the tension of which is adjusted by a nut 39 (FIGURE 2). There extends between the leg portions 33 and 34 of the double-armed lever 26 an intermediate lever 40 also pivotally retained about the bolt 29, the free end of which is provided with an eye portion 41 (FIGURE 4) for the insertion of a pull or Bowden cable 42. The pull or Bowden cable 42 is retained in its position in a support member 43 with respect to the brake linkage.

An automatic readjusting mechanism generally designated by references numeral 44 the details of which are shown in FIGURE 4, is arranged between the actuating levers 26 and 40 which are inclined with respect to each other. The readjusting mechanism 44 essentially consists of a ball 46 spring-loaded by a compression spring 45 which ball 46 slides within grooves 47 and 48 of the intermediate lever 40 and of the double lever 26. The compression spring 45 is guided on a threaded pin 49 which is threadably inserted into the lower end of the lever 26. The compression spring 45 pretensions the levers 26 and 40 against each other whereby, in the neutral position, the lever 40 is forced against an abutment 50 secured at the sheet metal cover 21.

If the brake cable 42 is moved by any suitable manipulation or the like, in the direction of arrow R (FIGURE 1), then the double lever 26 is pivoted about the bolt 29 by the lever 40 through the ball 46 with the result that the friction surfaces 16 of the brake segment 15 are pressed against the friction surfaces 17 and 18 of the brake disk 7 and therewith hold the vehicle. The adjusting disk 37 initially does not partake in the swinging movement by reason of the pre-existing play between the projection 35 of the double-armed lever 26 and the recess 36.

If the brake is now disengaged, then the return spring 30 pulls the double-armed lever 26 back into its initial position illustrated in FIGURE 1 whereby the intermediate lever 40 is also moved through the ball 46 into engagement against the respective abutment 50. Simultaneously therewith, the projection 35 of the double-armed lever 26 assumes its initial position illustrated in FIGURE 1 with respect to the recess 36 of the adjusting disk 37.

If the course of operation, the friction surfaces 16 of the brake segment 15 become worn, then the pre-existing play between the projection 35 and the recess 36 becomes excessively so large that a longer actuating path would have to be traversed up to the point of safe braking of the vehicle. In order to avoid this, the adjusting disk 37, with an excessively large play of the brake segment 15 with respect to its friction surfaces, is swung against the force of the disk-shaped spring 38 by the projection 35 of the double-armed lever 26 about the bolt 29, and more particularly for such a distance until the extent of wear is compensated and the safe braking of the wheel is assured. If the brake is now disengaged, then, by reason of the fact that the force of the dish-shaped spring 38 overcomes the force of the return spring 30, the adjusting disk 37 remains stationary in the position assumed in the preceding braking position thereof whereby the projection 35 can slide back into its recess 36 exclusively by the desired amount of the venting play. The change in the position of levers 26 and 40 with respect to each other that occurs during such readjustment is automatically compensated by the ball 46 with the aid of the compression spring 45. The ball 46 slides thereby further in the upward direction as viewed in FIGURE 4 within the grooves 47 and 48 coordinated thereto until the intermediate lever 40 abuts anew against its abutment 50. The stretching in length of the brake cable 42 is compensated for, in a known manner, by the adjusting screw 52 guided within a threaded sleeve 51.

The brake segment 15 is made in the illustrated embodiment of grey cast iron and cooperates directly with the friction surfaces of the brake disk 7 consisting of steel. However, it is also possible and within the scope of the present invention to provide the brake segment 15 with friction linings 10' as are provided, for instance, at the brake shoes 10 of the foot brake installation.

While I have shown and described one embodiment in accordance with the present invention, it is understood that the same is not limited thereto but is susceptible of many changes and modifications within the spirit and scope thereof. For example, the present invention is also applicable to brake disks having friction surfaces for the foot brake installations arranged parallelly to each other. In that case, it is only necessary to provide for the hand brake along the outer periphery of the brake disk mutually inclined friction surfaces inclined at an angle with respect to each other.

Thus, it is obvious that the present invention is not limited to the details shown and described herein, but is susceptible of numerous modifications within the spirit and scope thereof, and I, therefore, do not wish to be limited to the details shown and described herein, but intend to cover all such changes and modifications as are encompassed by the scope of the appended claims.

I claim:

1. Disk brake means for vehicles having a foot brake installation and manually operable parking brake means, said parking brake means being operable independently of said foot brake installation and including substantially wedge-shaped brake segment means, said disk brake means including a brake disk positioned within a vehicle wheel rim and common to said manually actuatable parking brake and to said foot brake installation, said brake disk being provided with first friction surface means comprising spaced external inclined friction surface means for engagement with the friction members of said foot brake installation and with second friction surface means comprised of slot means disposed between said first friction surface means, said slot means being arranged at the circumference of the brake disk means, said second friction surface means being inclined to each other at an angle, said brake segment means cooperating with said second friction surface means to produce a braking effect upon actuation of said manually actuatable parking brake means.

2. In a disk-brake installation accommodated within the wheel rim of a wheel and provided with a brake disk having adjacent oppositely inclined brake surface means along the circumference thereof, the combination of a manually actuatable brake mechanism comprising substantially wedge-shaped brake segment means effectively forming brake engaging surface means of substantially complementary configuration to the brake surface means of said brake disk, said brake segment means being accommodated within said wheel rim, and an actuating mechanism for said manually actuatable brake mechanism including actuating lever means in engagement with said brake segment means, means swingingly supporting said lever means within said wheel rim, actuating linkage means including a lever member pivotally supported on said means swingingly supporting said lever means, and means in contact with and relatively movable with respect to said lever means and said lever member for operatively connecting said actuating linkage means with said lever means.

3. A disk brake assembly for vehicles, comprising manually actuatable brake means including substantially wedge-shaped brake segment means, a foot brake installation operable independently of said manually actuatable brake means, a brake disk common to and engaged by both said foot brake installation and said manually actuatable brake and provided with slot means comprising friction surface means arranged at the circumference of the brake disk and inclined to each other at an angle, said brake segment means cooperating with said friction surface means to produce a braking effect upon actuation of said manually actuatable brake means, means including relatively fixed abutment means and spring means for retaining said brake segment means with limited circumferential play between said abutment means at the circumference of said brake disk, and actuating means operatively connected with said brake segment means for selectively actuating the latter, further friction surface means on said brake disk cooperating with said foot brake installation, said further friction surface means comprising spaced inclined friction surfaces on exterior peripheral portions of said brake disk, said slot means being disposed between said spaced friction surfaces.

4. A disk brake assembly for vehicles having a foot brake installation and manually actuatable parking brake means, said parking brake means being operable independently of said foot brake installation and including substantially wedge-shaped brake segment means, said disk brake assembly including a brake disk common to and engaged by both said foot brake installation and said manually actuatable parking brake means and provided with friction surface means arranged at the circumference of said brake disk and inclined to each other at an angle, said brake segment means having friction surface means cooperating with said friction surface means of said disk to produce a braking effect upon actuation of said manually actuatable brake means, means including relatively fixed abutment means and spring means for retaining said brake segment means with limited circumferential play between said abutment means at the circumference of said brake disk, and actuating means operatively connected with said brake segment means for selectively actuating the latter including a swingable pressure member having an axis of rotation disposed laterally of said brake segment means, a brake linkage, and connecting means including an intermediate lever and readjusting means operatively connecting said pressure member with said brake linkage, said readjusting means being effective to compensate for wear of said friction surface means of said brake disk and said brake segment means, said readjusting means comprising a member in adjustably movable engagement with said pressure member and said intermediate lever.

5. A disk brake assembly for vehicles having a foot brake installation and manually actuatable parking brake means, said parking brake means being operative independently of said foot brake installation and including substantially wedge-shaped brake segment means, said disk brake assembly including a brake disk common to and engaged by both said foot brake installation and to said manually actuatable brake said brake disk comprising first friction surface means engageable by said foot brake installation and second friction surface means arranged at the circumference of the brake disk and inclined to each other at an angle, said brake segment means having friction surface means cooperating with said second friction surface means to produce a braking effect upon actuation of said manually actuatable brake means, means including relatively fixed abutment means and spring means for retaining said brake segment means with limited circumferential play between said abutment means at the circumference of said brake disk, said manually actuatable parking brake means including actuating means operatively connected with said brake segment means for selectively actuating the latter to produce a braking effect including a swingable pressure member having an axis of rotation disposed laterally of said brake segment means, a brake linkage, and connecting means including an intermediate lever and readjusting means for compensating for wear of said second friction surface means and said friction surface means of said brake segment means, said connecting means operatively connecting said pressure member with said brake linkage, said readjusting means being automatically operative and including grooves in said pressure member and in said intermediate lever, a spring-loaded adjusting disk and a spring-loaded ball slidable within said grooves of said pressure member and of said intermediate lever.

6. A disk brake assembly for vehicles having a foot brake installation and manually actuatable parking brake means, said parking brake means being operable independently of said foot brake installation and including substantially wedge-shaped brake segment means, said disk brake assembly including a brake disk engageable by and common to both said foot brake installation and said manually actuatable parking brake means, said brake disk being provided with friction surface means arranged at the circumference of the brake disk and inclined to each other at an angle, said brake segment means having further friction surface means cooperating with said friction surface means to said disk to produce a braking effect upon actuation of said manually actuatable parking brake means, means including relatively fixed abutment means and spring means for retaining said brake segment means with limited circumferential play between said abutment means at the circumference of said brake disk, and actuating means operatively connected with said brake segment means for selectively actuating the latter including a swingable pressure member having an axis of rotation disposed laterally of said brake segment means, a brake linkage, and connecting means including an intermediate lever and readjusting means effective to compensate for wear of said friction surface means and said further friction surface means, said connecting means operatively connecting said pressure member with said brake linkage, said readjusting means being automatically operative and including grooves in said pressure member and in said intermediate member, a spring-loaded adjusting disk and a spring-loaded ball slidable within said grooves of said pressure member and of said intermediate lever, and said pressure member being constituted by a double-armed lever of substantially U-shaped cross section effectively forming two leg portions, return spring means in operative engagement with one of said leg portions, the other leg portion being in operative engagement with said adjusting disk, the spring force of said spring-loaded adjusting disk overcoming the spring force of said return spring means.

7. In a disk-brake installation accommodated within the wheel rim of a wheel and provided with a brake disk having adjacent oppositely inclined brake surface means along the circumference thereof, the combination of a manually actuatable brake mechanism comprising substantially wedge-shaped brake segment means effectively forming brake engaging surface means of substantially complementary configuration to the brake surface means of said brake disk, said brake segment means being accommodated within said wheel rim, and an actuating mechanism for said manually actuatable brake mechanism including actuating lever means for said brake segment means, means swingingly supporting said lever means within said wheel rim, actuating linkage means, and means operatively connecting said actuating linkage means with said lever means including automatic readjustment means to compensate for wear in the brake engaging surface means, said actuating linkage means comprising a lever member, said automatic readjustment means comprising a movable member adjustably disposed between and in contact with said actuating lever means and said lever member.

8. A disk brake assembly for vehicles comprising manually actuatable brake means including substantially wedge-shaped brake segment means effectively providing friction surface means, brake disk means having brake surface means arranged at the circumference of the brake disk means, said brake surface means being inclined to each other at an angle to receive therebetween said brake segment means, said brake segment means cooperating with the brake surface means of said brake disk means to produce a braking effect upon actuation of said manually actuatable brake means, and actuating means for said brake segment means to produce a braking effect including pivotally mounted lever means in the form of a double-armed lever of substantially U-shaped cross section and of an intermediate lever, and readjusting means for automatically compensating for wear in said friction surface means including a spring-loaded adjusting disk, one leg portion of the U of said double-armed lever being in operative engagement with said adjusting disk to entrain the latter, and return spring means in operative engagement with the other leg portion and of lesser spring force than the spring force spring-loading the adjusting disk, the said engagement of said leg portion with said spring loaded adjusting disk being effective to limit the extent of the return movement of said double armed lever under the influence of said return spring means.

9. A disk brake assembly for a wheel having a wheel rim, comprising a brake disk provided within the wheel rim, a manually actuatable brake engaging said brake disk, another brake installation engaging said brake disk independently of said manually actuatable brake and provided with selectively actuatable brake disk engaging means, said manually actuatable brake including self-centering brake segment means, said brake disk having slot means including friction surface means arranged at the circumference thereof, said brake segment means having surface portions cooperating with said friction surface means to produce a braking effect upon actuation of said manually actuatable brake, further surface friction means including inclined friction surfaces on said brake disk for cooperation with said another brake installation, said first-named friction surface means being arranged inwardly between said inclined friction surfaces.

References Cited in the file of this patent

UNITED STATES PATENTS

| | | |
|---|---|---|
| 1,505,216 | Myrick | Aug. 19, 1924 |
| 1,756,979 | Hunt | May 6, 1930 |
| 2,152,104 | Tatter | Mar. 28, 1939 |
| 2,582,755 | Kenny | Jan. 15, 1952 |
| 2,940,550 | Matthews | June 14, 1960 |
| 2,987,144 | Urquhart | June 6, 1961 |

FOREIGN PATENTS

| | | |
|---|---|---|
| 864,472 | Great Britain | Apr. 6, 1961 |